United States Patent
Okabe et al.

(10) Patent No.: US 10,386,624 B2
(45) Date of Patent: Aug. 20, 2019

(54) MICROSCOPE-IMAGE PROCESSING APPARATUS, MICROSCOPE-IMAGE PROCESSING METHOD, AND MICROSCOPE-IMAGE PROCESSING PROGRAM

(71) Applicant: OLYMPUS CORPORATION, Tokyo (JP)

(72) Inventors: Masashi Okabe, Tokyo (JP); Shohei Imamura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 105 days.

(21) Appl. No.: 15/689,362

(22) Filed: Aug. 29, 2017

(65) Prior Publication Data

US 2018/0067297 A1 Mar. 8, 2018

(30) Foreign Application Priority Data

Sep. 2, 2016 (JP) ................................. 2016-171455

(51) Int. Cl.
*G02B 21/36* (2006.01)
*G06T 7/90* (2017.01)
(Continued)

(52) U.S. Cl.
CPC .......... *G02B 21/367* (2013.01); *G06T 3/4038* (2013.01); *G06T 5/005* (2013.01);
(Continued)

(58) Field of Classification Search
CPC ......... G02B 21/367; G06T 5/50; G06T 5/005; G06T 7/90; G06T 11/001; G06T 3/4038;
(Continued)

(56) References Cited

U.S. PATENT DOCUMENTS

2005/0037406 A1 2/2005 De La Torre-Bueno
2011/0249910 A1 10/2011 Henderson et al.
2015/0042782 A1 2/2015 Koga

FOREIGN PATENT DOCUMENTS

JP 2013-524369 A 6/2013
JP 2014-224929 A 12/2014
(Continued)

OTHER PUBLICATIONS

Extended European Search Report dated Nov. 24, 2017 in European Patent Application No. 17 17 3693.7.

*Primary Examiner* — Qian Yang
(74) *Attorney, Agent, or Firm* — Scully, Scott, Murphy & Presser, P.C.

(57) ABSTRACT

A microscope-image processing apparatus including: a processor including hardware, wherein the processor is configured to implement: a captured-region-image generating portion configured to generate a captured-region image by pasting together a plurality of partial images acquired by using a microscope while changing a viewing field with respect to a sample; an uncaptured-region-color setting portion configured to set pixel values of an uncaptured region based on pixel values of rows of pixels at at least one side of the partial images that are positioned at edge portions of the captured-region image generated by the captured-region-image generating portion; and an image combining portion configured to generate a combined image by combining the captured-region image generated by the captured-region-image generating portion and an uncaptured-region image that has the pixel values set by the uncaptured-region-color setting portion.

9 Claims, 9 Drawing Sheets

(51) Int. Cl.
*G06T 3/40* (2006.01)
*G06T 11/00* (2006.01)
*G06T 5/00* (2006.01)
*G06T 5/50* (2006.01)

(52) U.S. Cl.
CPC .................. *G06T 5/50* (2013.01); *G06T 7/90* (2017.01); *G06T 11/001* (2013.01); *G06T 2200/32* (2013.01); *G06T 2207/10056* (2013.01); *G06T 2207/20216* (2013.01)

(58) Field of Classification Search
CPC ....... G06T 2200/32; G06T 2207/20216; G06T 2207/10056
See application file for complete search history.

(56) References Cited

FOREIGN PATENT DOCUMENTS

| | | |
|---|---|---|
| JP | 2015-035782 A | 2/2015 |
| WO | 2011/127361 A2 | 10/2011 |

MICROSCOPE-IMAGE PROCESSING APPARATUS, MICROSCOPE-IMAGE PROCESSING METHOD, AND MICROSCOPE-IMAGE PROCESSING PROGRAM

CROSS-REFERENCE TO RELATED APPLICATIONS

This application is based on Japanese Patent Application No. 2016-171455, the contents of which are incorporated herein by reference.

TECHNICAL FIELD

The present invention relates to a microscope-image processing apparatus, a microscope-image processing method, and a microscope-image processing program.

BACKGROUND ART

In the related art, there is a known microscope system that generates a pasted image in which a plurality of partial images formed by capturing different regions of a sample are pasted together (for example, see Patent Literature 1).

In the case in which images are pasted together by capturing images of only an area of interest to a user instead of the entire sample by using this microscope system, a pasted image in which only the partial images of the area of interest are pasted together in a mosaic-like manner in a portion of the entire image area is generated.

With such a pasted image in which only the partial images of the area of interest are pasted together in a mosaic-like manner in a portion of the entire image area, in general, by filling regions in which the partial images do not exist with a predetermined color in accordance with the employed observation method, processing for making boundaries between the background color of the partial images that have been captured and the color of regions in which images thereof have not been captured inconspicuous is performed by making these colors as similar to each other as possible. For example, in the case of a bright-field image, the filling processing is performed by using white (which is corrected by using a white balance value of a camera used when capturing the image), and, in the case of a fluorescence image, the filling processing is performed by using black.

CITATION LIST

Patent Literature

{PTL 1} Japanese Unexamined Patent Application, Publication No. 2014-224929

SUMMARY OF INVENTION

An aspect of the present invention provides a microscope-image processing apparatus including: a captured-region-image generating portion that generates a captured-region image by pasting together a plurality of partial images acquired by using a microscope while changing a viewing field with respect to a sample; an uncaptured-region-color setting portion that sets pixel values of an uncaptured region on the basis of pixel values of rows of pixels at at least one side of the partial images that are positioned at edge portions of the captured-region image generated by the captured-region-image generating portion; and an image combining portion that generates a combined image by combining the captured-region image generated by the captured-region-image generating portion and an uncaptured-region image that has the pixel values set by the uncaptured-region-color setting portion.

Another aspect of the present invention provides a microscope-image processing method including: a captured-region-image generating step of generating a captured-region image by pasting together a plurality of partial images acquired by using a microscope while changing a viewing field with respect to a sample; an uncaptured-region-color setting step of setting pixel values of an uncaptured region on the basis of pixel values of rows of pixels at at least one side of the partial images that are positioned at edge portions of the captured-region image generated in the captured-region-image generating step; and an image combining step of generating a combined image by combining the captured-region image generated in the captured-region-image generating step and an uncaptured-region image that has the pixel values set in the uncaptured-region-color setting step.

In addition, another aspect of the present invention provides a microscope-image processing program that causes a computer to execute: a captured-region-image generating step of generating a captured-region image by pasting together a plurality of partial images acquired by using a microscope while changing a viewing field with respect to a sample; an uncaptured-region-color setting step of setting pixel values of an uncaptured region on the basis of pixel values of rows of pixels at at least one side of the partial images that are positioned at edge portions of the captured-region image generated in the captured-region-image generating step; and an image combining step of generating a combined image by combining the captured-region image generated in the captured-region-image generating step and an uncaptured-region image that has the pixel values set in the uncaptured-region-color setting step.

DESCRIPTION OF EMBODIMENT

A microscope-image processing apparatus 1, a microscope-image processing method, and a microscope-image processing program according to an embodiment of the present invention will be described below with reference to the drawings.

Figure 1:
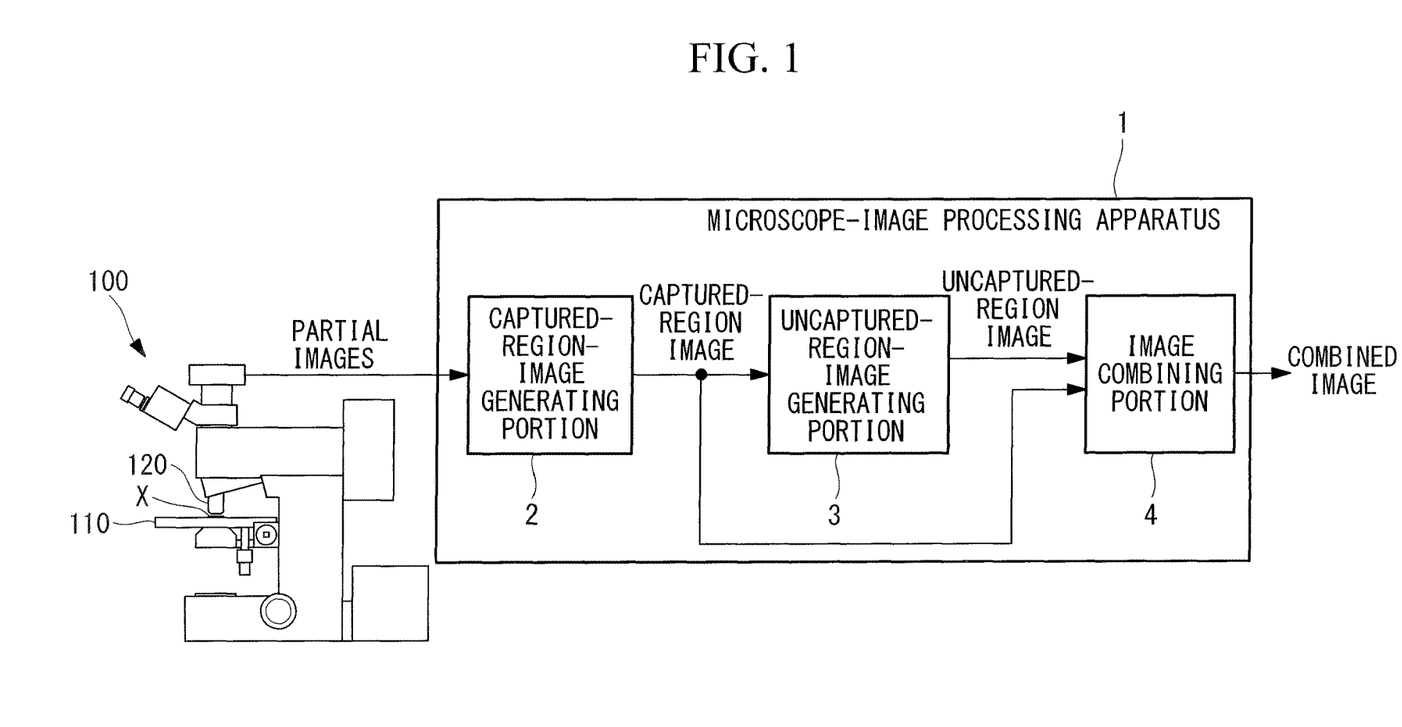
FIG. 1 is a block diagram showing a microscope-image processing apparatus according to an embodiment of the present invention.

As shown in FIG. 1, the microscope-image processing apparatus 1 according to this embodiment is connected to a microscope 100. The microscope-image processing apparatus 1 is configured such that a user operates the microscope 100 to move a sample X on a stage 110 and an objective lens 120 relative to each other in the horizontal direction so that a plurality of partial images of the sample X, which have been acquired by using the microscope 100 while changing the viewing field with respect to the sample X, are input.

Figure 2:
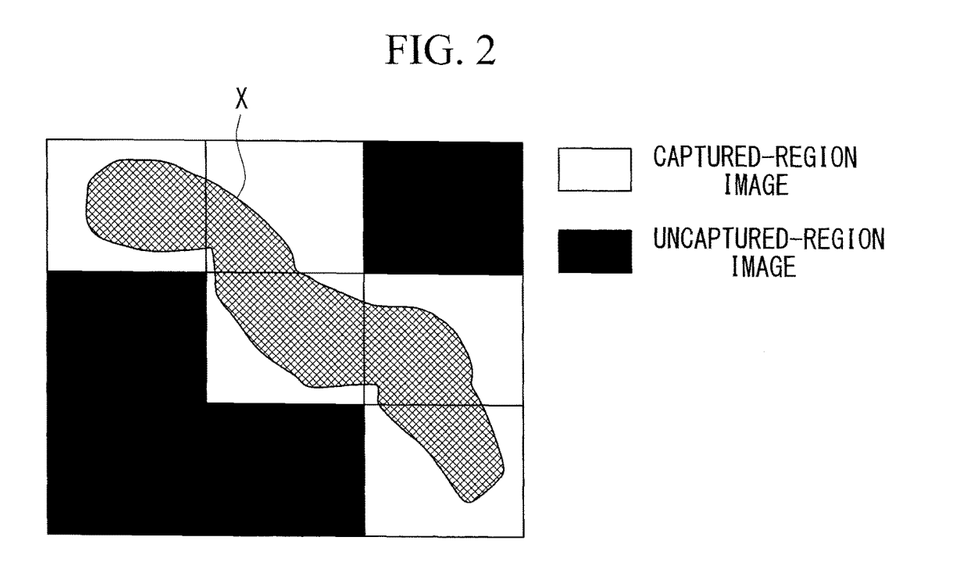
FIG. 2 is a diagram showing an example of a captured-region image acquired by using the microscope-image processing apparatus in FIG. 1.

As shown in FIG. 2, the microscope-image processing apparatus 1 is provided with: a captured-region-image generating portion 2 that generates a mosaic-like captured-region image that forms a portion of a final combined image by pasting together the plurality of input partial images; an uncaptured-region-image generating portion (uncaptured-region-color setting portion) 3 that generates an image of uncaptured regions that are positioned in the black-filled portion in FIG. 2 on the basis of the captured-region image generated by the captured-region-image generating portion 2; and an image combining portion 4 that generates a quadrangular (rectangular in this embodiment) combined image by combining the generated uncaptured-region image and the captured-region image.

Here, for example, a general-purpose processor, such as a general-purpose computer, a personal computer, or the like, that is operated by means of a computer program can be employed as the hardware constituting the microscope-image processing apparatus 1.

Figure 3:
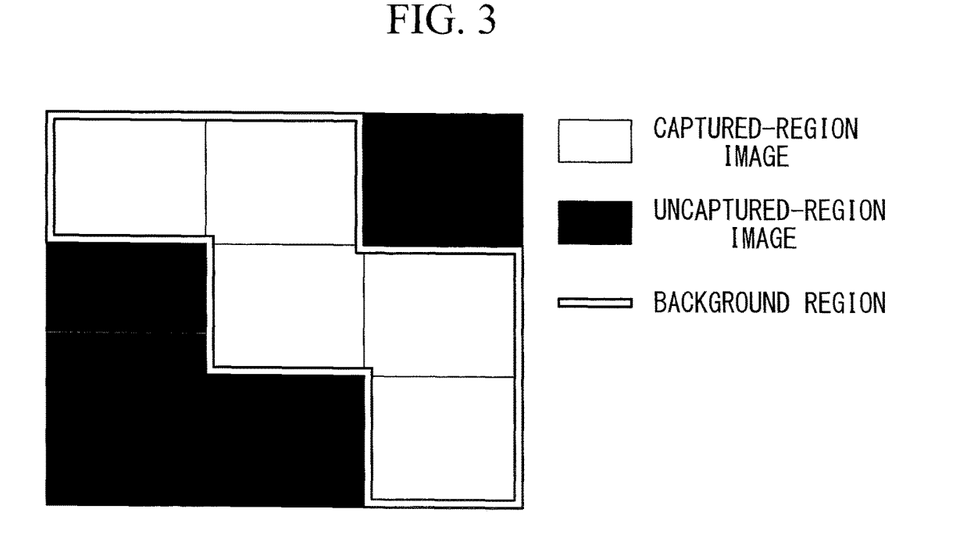
FIG. 3 is a diagram showing the position of a row of pixels at which pixel values for setting the color of an uncaptured region are identified in the microscope-image processing apparatus in FIG. 1.

As indicated by the double lines in FIG. 3, the uncaptured-region-image generating portion 3 detects pixel values of rows of pixels positioned, over the entire perimeter, at the outermost edge portions of the captured-region image that the captured-region-image generating portion 2 has generated by pasting together the plurality of partial images, and determines the mode thereof. Then, the uncaptured-region-image generating portion 3 generates an uncaptured-region image in which the pixel values of the entire black-filled portion in FIG. 3 are set to the determined single mode.

A microscope-image processing method employing the thus-configured microscope-image processing apparatus 1 according to this embodiment will be described below.

Figure 4:
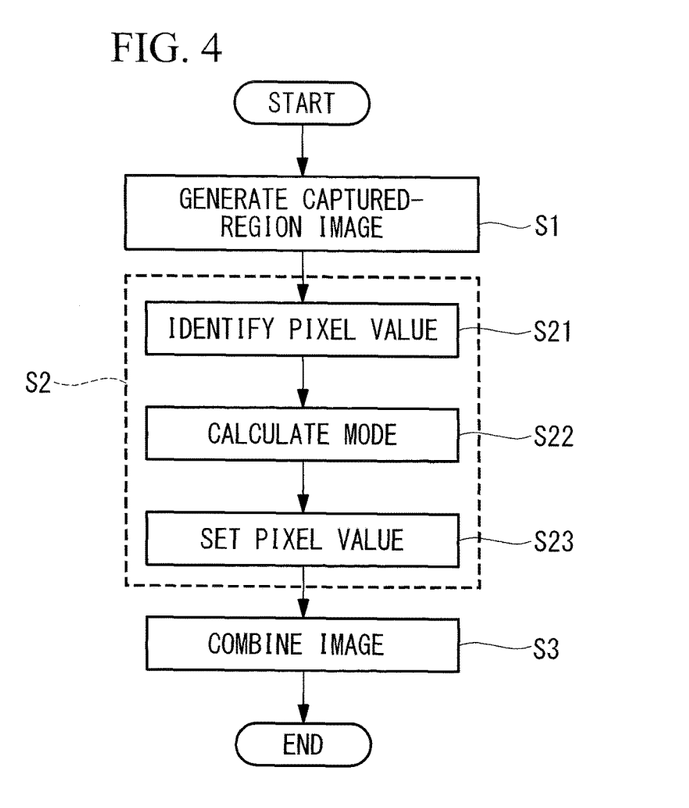
FIG. 4 is a flowchart showing a microscope-image processing method employing the microscope-image processing apparatus in FIG. 1.

As shown in FIG. 4, the microscope-image processing method according to this embodiment includes: a captured-region-image generating step S1 of generating, by means of the captured-region-image generating portion 2, the captured-region image by pasting together the plurality of partial images acquired by using the microscope 100; an uncaptured-region-image generating step (uncaptured-region-color setting step) S2 of generating the uncaptured-region image by means of the uncaptured-region-image generating portion 3 on the basis of the pixel values of the rows of pixels positioned, over the entire perimeter, at the outermost edge portions of the captured-region image generated in the captured-region-image generating step S1; and an image combining step S3 of generating, by means of the image combining portion 4, the combined image by combining the captured-region image generated in the captured-region-image generating step S1 and the uncaptured-region image generated in the uncaptured-region-image generating step S2.

In more detail, the uncaptured-region-image generating step S2 includes: a pixel-value identifying step S21 of identifying the pixel values of one row of pixels positioned, over the entire perimeter, at the outermost edge portions of the input captured-region image; a mode calculating step S22 of calculating the mode of the identified pixel values; and a pixel-value setting step S23 of setting the pixel values of the uncaptured regions excluding the captured-region image from the rectangular region that forms the final combined image to the calculated mode.

Figure 5:
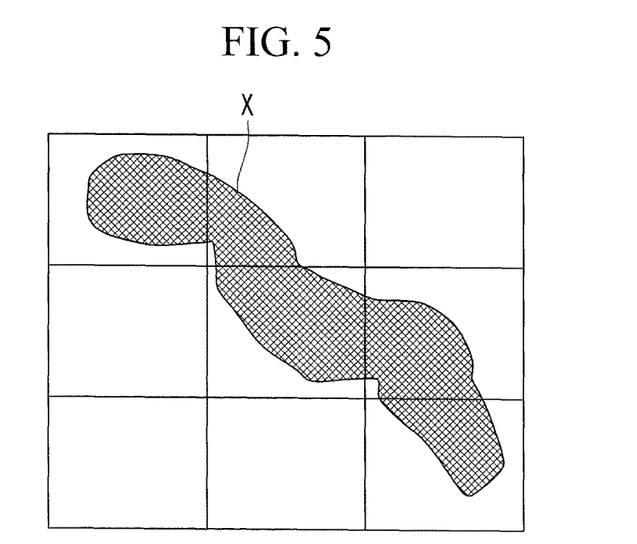
FIG. 5 is a diagram showing an example of a combined image generated by using the microscope-image processing apparatus in FIG. 1.

As has been described above, with the microscope-image processing apparatus 1 and the microscope-image processing method according to this embodiment, because the color of the uncaptured regions excluding the captured-region image in the final combined image is set to a color similar to the typical color of the rows of pixels at the edge portions over the entire perimeter of the captured-region image, it is possible, in the combined image combined by means of the image combining portion 4, to make the boundaries between the captured-region image and the uncaptured-region image inconspicuous, as shown in FIG. 5.

In other words, there is an advantage in that, even in the case in which white balance adjustment of the camera when capturing the partial images or shading during fluorescence observation is not satisfactorily performed, it is possible to match the color of the uncaptured-region image with the background color of the captured-region image, which is formed by pasting together the partial images, and thus, it is possible to generate a combined image in which the boundaries between the captured-region image and the uncaptured-region image are inconspicuous.

In particular, because the pixel values of the rows of pixels at the outermost edge portions of the captured-region image are used as the pixel values of the uncaptured-region image, it is possible to set a color that is similar to the background color. In other words, because the captured-region image is generally set by the user so as to cover an area including the entire sample X, the color of the rows of pixels positioned at the outermost edge portions of the captured-region image often is the same as the background color. Therefore, by calculating the mode of the pixel values of those rows of pixels, it is possible to select a color that is most similar to the background color.

Figure 6:
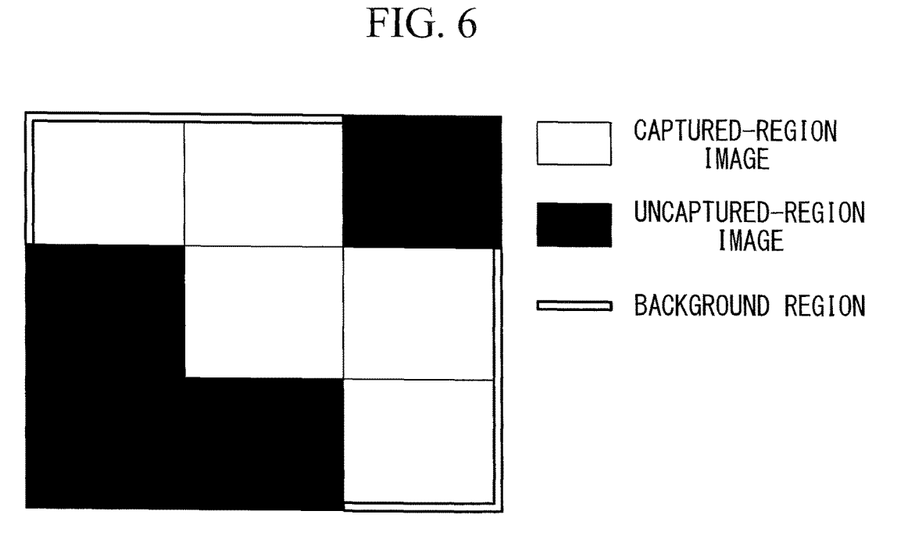
FIG. 6 is a diagram showing a first modification of the position of the row of pixels in FIG. 3.

Note that, in this embodiment, although the uncaptured-region-image generating portion 3 is assumed to identify the pixel values of one row of pixels positioned, over the entire perimeter, at the outermost edge portions of the captured-region image and to determine the mode thereof, alternatively, as shown in FIG. 6, the mode of the pixel values may be determined only on the basis of rows of pixels positioned at the outer peripheries of the final combined image instead of the entire perimeter of the captured-region image.

Figure 7:
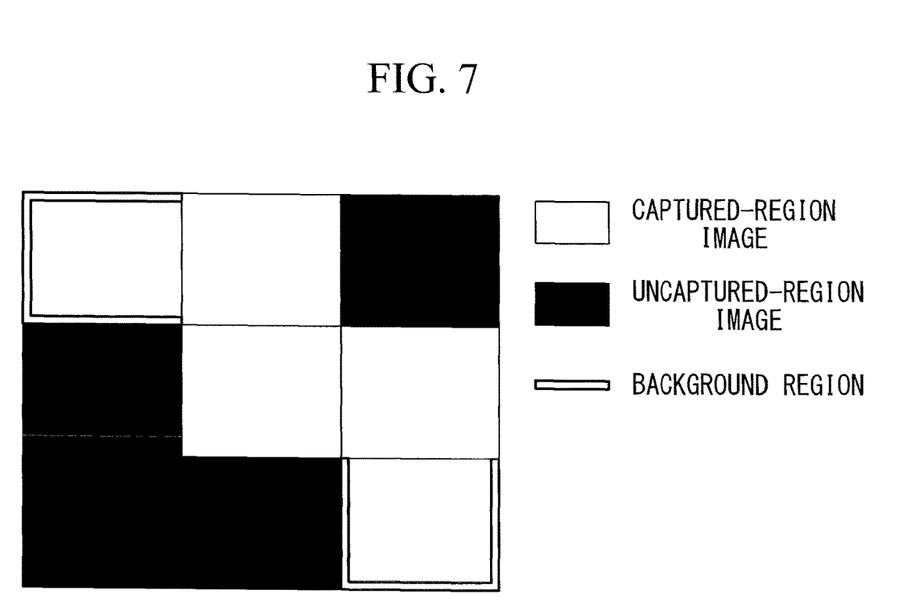
FIG. 7 is a diagram showing a second modification of the position of the row of pixels in FIG. 3.
Figure 8:
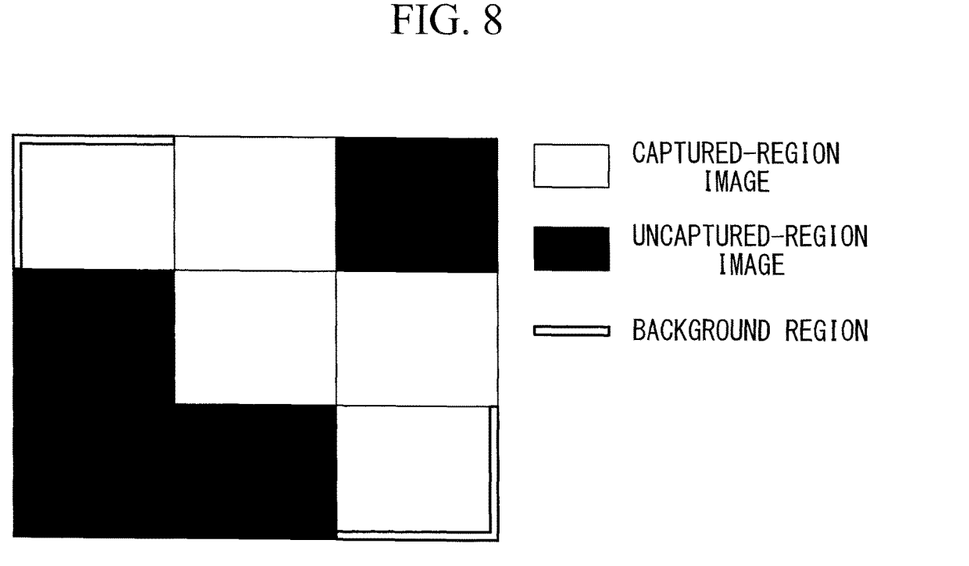
FIG. 8 is a diagram showing a third modification of the position of the row of pixels in FIG. 3.

In addition, as shown in FIG. 7, the pixel values for which the mode is to be determined may additionally be limited to the pixel values of the rows of pixels at peripheral edges of the partial images to be positioned at the four corners of the combined image, and, furthermore, among those pixels, the mode of the pixel values may be determined only on the basis of rows of pixels positioned at the outer peripheries of the final combined image, as shown in FIG. 8.

In addition, in this embodiment, although the pixel values of the uncaptured-region image are set to the mode of the identified pixel values, alternatively, the average thereof may be employed.

In addition, among the rows of pixels in the above-described FIG. 3 and FIGS. 6 to 8, the average or the mode of the pixel values of a row of pixels in which the difference between the minimum value and the maximum value is the smallest may be set as the pixel values of the uncaptured-region image. In the case in which the difference is the smallest, it is possible to consider that only the background color is included, it is possible to set the color of the uncaptured-region image to the color that is most similar to the background color, and thus, it is possible to make the boundaries inconspicuous.

In addition, this embodiment may be combined with another setting method.

Figure 9:
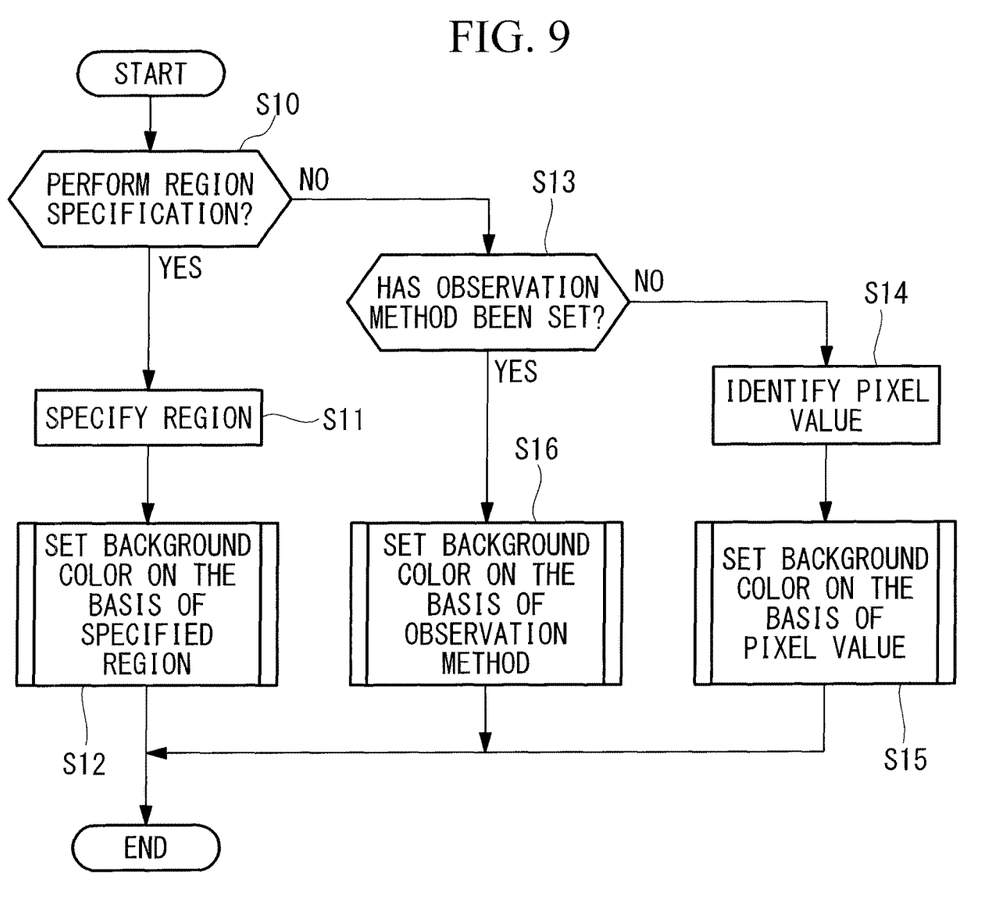
FIG. 9 is a flowchart showing a modification of the microscope-image processing method in FIG. 4.

FIG. 9 shows a flowchart for the case in which another setting method is combined with the above-described method.

First, whether or not to specify the background region is determined (step S10). For example, as shown in FIG. 10, by checking the check box "SPECIFY BACKGROUND REGION BEFORE CAPTURING IMAGE" in the preparatory setting before acquiring the partial images of the sample X, the operating screen in FIG. 11 is displayed on the display.

Figure 12:
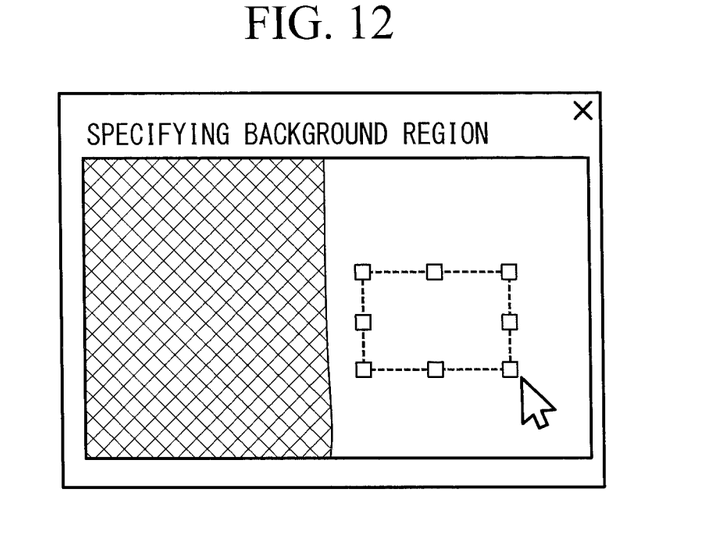
FIG. 12 is a diagram showing an example of a background-region specifying screen displayed following the image-capturing starting instruction in FIG. 11.

When the user presses the image-capturing start switch on the operating screen, as shown in FIG. 12, the user surrounds the background-color region in the live image displayed on the display by using an input means such as a mouse or the like, thus specifying the background-color region (step S11), and the background color is set on the basis of the pixel values in the specified region (step S12).

Figure 10:
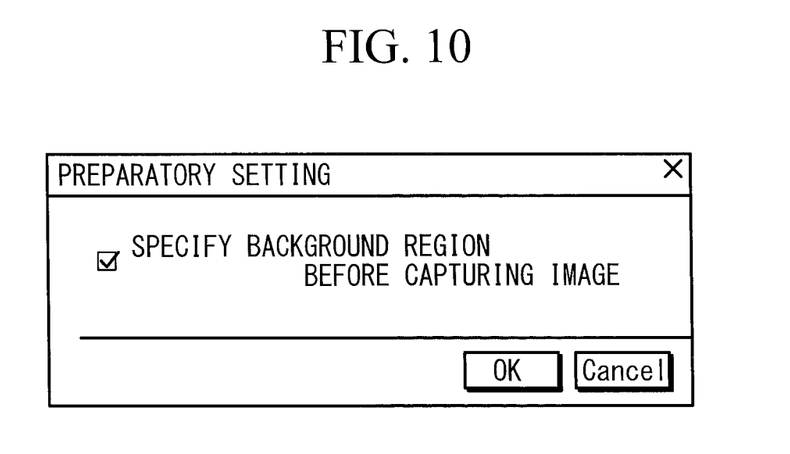
FIG. 10 is a diagram showing an example of an operating screen with which preparatory setting is performed before acquiring partial images of a sample in the microscope-image processing method in FIG. 9.
Figure 11:
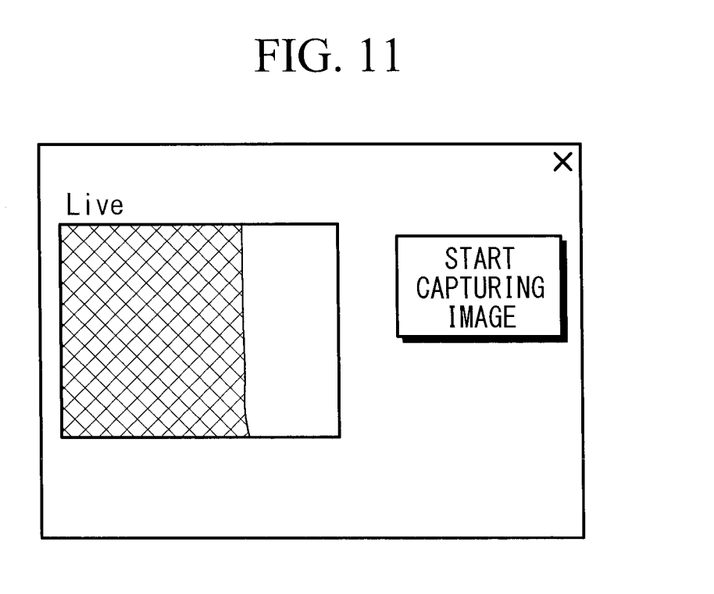
FIG. 11 is a diagram showing an example of an operating screen with which partial image capturing is started in the microscope-image processing method in FIG. 9.
Figure 13:
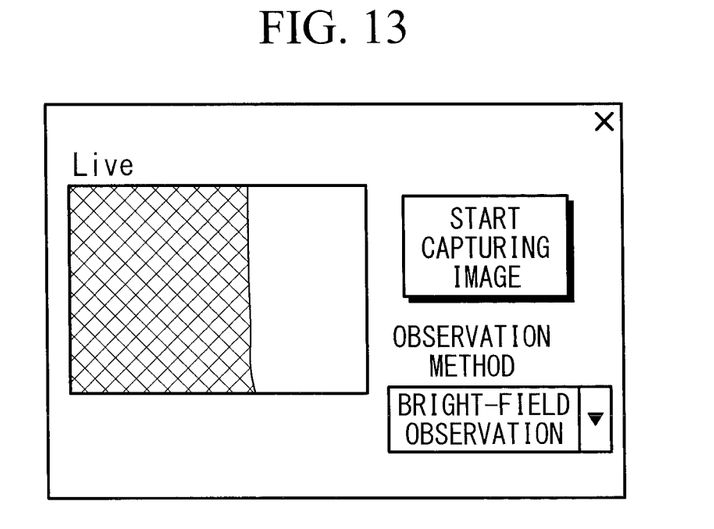
FIG. 13 is a diagram showing an example of the operating screen with which the partial image capturing is started in the case in which a check box is unchecked in the preparatory screen in FIG. 10.

On the other hand, the setting method may be configured so that, by unchecking the check box in FIG. 10, the user can select an observation method from options (pull-down menu) for selecting the observation method, as shown in FIG. 13.

The pull-down menu displays menu items "OBSERVATION METHOD NOT SPECIFIED", "BRIGHT-FIELD OBSERVATION", "PHASE-CONTRAST OBSERVATION", "DARK-FIELD OR FLUORESCENCE OBSERVATION", and "OTHER", and the user can select one of the menu items.

When "OBSERVATION METHOD NOT SPECIFIED" is selected (step S13), and the image-capturing start switch is pressed on the operating screen in FIG. 13, the pixel values of predetermined rows of pixels are identified by using the microscope-image processing method according to this embodiment (step S14), and the background color is set on the basis of the identified pixel values (step S15).

Figure 14:
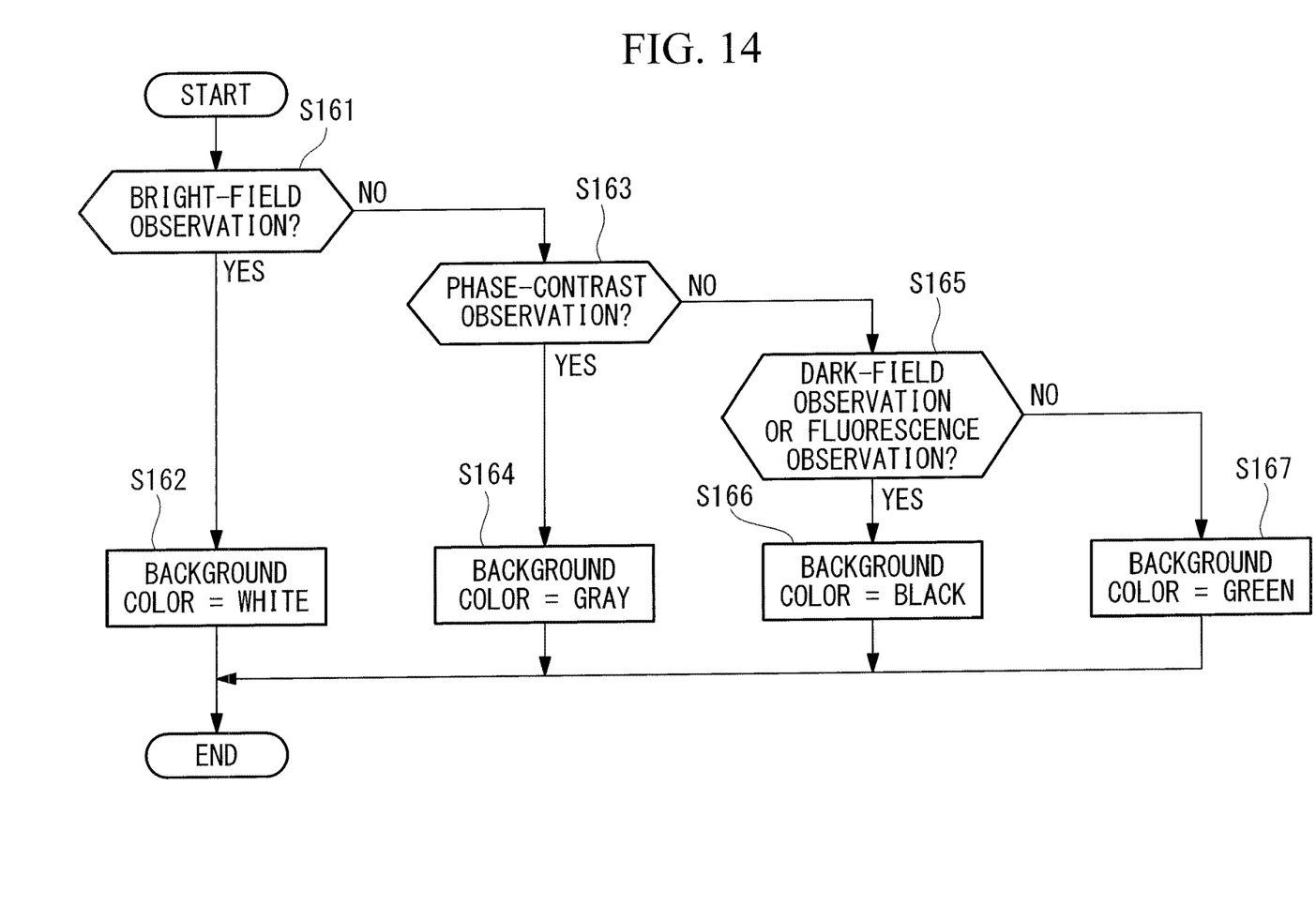
FIG. 14 is a flowchart showing details of step S16 in FIG. 9 in the case in which the observation method is specified by using a pull-down menu in FIG. 13.

In addition, in step S16 of setting the background color in accordance with the observation method, as shown in FIG. 14, when "BRIGHT-FIELD OBSERVATION" is selected (step S161), the background color is set to white (step S162); when "PHASE-CONTRAST OBSERVATION" is selected (step S163), the background color is set to gray (step S164); when "DARK-FIELD OR FLUORESCENCE OBSERVA-TION" is selected, (step S165), the background color is set to black (step S166); and, when "OTHER" is selected, the background color is set to green (step S167).

In addition, although this embodiment has been described in terms of a configuration that realizes the microscope-image processing method by means of hardware, the method may be realized by means of a microscope-image processing program that can be executed by using a computer. In this case, the computer is provided with a CPU, a main storing device such as a RAM, or the like, and a computer-readable recording medium, and the microscope-image processing program for realizing the above-described processing is recorded in the recording medium. Thus, the CPU to read out the microscope-image processing program recorded in the recording medium, and processing similar to that performed by the microscope-image processing apparatus 1 can be realized.

As a result, the above-described embodiment leads to the following aspects.

An aspect of the present invention provides a microscope-image processing apparatus including: a captured-region-image generating portion that generates a captured-region image by pasting together a plurality of partial images acquired by using a microscope while changing a viewing field with respect to a sample; an uncaptured-region-color setting portion that sets pixel values of an uncaptured region on the basis of pixel values of rows of pixels at at least one side of the partial images that are positioned at edge portions of the captured-region image generated by the captured-region-image generating portion; and an image combining portion that generates a combined image by combining the captured-region image generated by the captured-region-image generating portion and an uncaptured-region image that has the pixel values set by the uncaptured-region-color setting portion.

With this aspect, when the plurality of partial images of the sample acquired by using a microscope are input, the captured-region-image generating portion generates the captured-region image by pasting together the plurality of partial images. In addition, the uncaptured-region-color setting portion sets the pixel values of the uncaptured region on the basis of the pixel values of the rows of pixels at at least one side of the partial images positioned at the edge portions of the generated captured-region image. Then, the image combining portion generates the combined image by combining the captured-region image and the uncaptured-region image that has the pixel values set by the uncaptured-region-color setting portion.

The captured-region image in which the plurality of partial images of the sample are pasted together often includes edges of the sample and background-color portions outside thereof, and thus, it is highly likely that the pixel values of the rows of pixels at at least one side of the partial images positioned at the edge portions thereof are the same as the pixel values that constitute the background color. Therefore, by setting the pixel values of the uncaptured regions on the basis of the pixel values of these rows of pixels, it is possible to make the color of the uncaptured regions similar to the background color of the captured-region image.

As a result, it is possible to generate a combined image in which boundaries between the captured-region image and the uncaptured regions are made inconspicuous even when white balance adjustment and shading are not appropriately performed during partial image acquisition.

In the above-described aspect, the uncaptured-region-color setting portion may set the pixel values of the uncaptured region on the basis of pixel values of the rows of pixels positioned at four sides of the combined image.

By doing so, it is possible to set the pixel values of the uncaptured region on the basis of the pixel values of the rows of the pixels positioned at the four sides of the combined image, which is often set so as to surround the outer side of the peripheral edges of the sample, and thus, it is possible to generate a combined image in which the boundaries between the captured-region image and the uncaptured regions are inconspicuous.

In addition, in the above-described aspect, the uncaptured-region-color setting portion may set the pixel values of the uncaptured region on the basis of pixel values of the rows of pixels positioned over the entire perimeter of the captured-region image.

By doing so, it is possible to set the pixel values of the uncaptured region on the basis of the pixel values of the rows of the pixels positioned over the entire perimeter of the captured-region image, which is often set so as to surround the outer side of the peripheral edges of the sample, and thus, it is possible to generate a combined image in which the boundaries between the captured-region image and the uncaptured regions are inconspicuous.

In addition, in the above-described aspect, the uncaptured-region-color setting portion may set the pixel values of the uncaptured region on the basis of pixel values of the rows of pixels positioned at peripheral edges of the partial images positioned at four corners of the combined image.

By doing so, in the combined image, which is often set so as to surround the outer side of the peripheral edges of the sample, it is possible to set the pixel values of the uncaptured region on the basis of the pixel values of the rows of the pixels at the peripheral edges of the partial images positioned at the four corners of the combined image, which is highly likely to include the background color outside the sample, and thus, it is possible to generate a combined image in which the boundaries between the captured-region image and the uncaptured regions are inconspicuous.

In addition, in the above-described aspect, the uncaptured-region-color setting portion may set the pixel values of the uncaptured region to an average or a mode of pixel values of the rows of pixels.

By doing so, it is possible to generate a combined image in which the boundaries between the captured-region image and the uncaptured regions are inconspicuous by more reliably identifying the background color, which is highly likely to be present at the edge portions of the uncaptured-region image, and by setting the background color to the pixel values of the region in which the setting has not been performed.

In addition, in the above-described aspect, the uncaptured-region-color setting portion may set the pixel values of the uncaptured region to an average or a mode of pixel values of the row of pixels in which the difference between a minimum value and a maximum value of pixel values is the smallest among the rows of pixels positioned at the four sides of the combined image, the rows of pixels positioned over the entire perimeter of the captured-region image, or the rows of pixels positioned at the peripheral edges of the partial images positioned at four corners of the combined image.

By doing so, it is possible to consider that the row of pixels in which the difference between the minimum value and the maximum value of the pixel values is the smallest include a large proportion of the background color of the area surrounding the sample, and thus, it is possible to more accurately identify the pixel values that constitute the background color by using the average and the mode of those pixel values.

Another aspect of the present invention provides a microscope-image processing method including: a captured-region-image generating step of generating a captured-region image by pasting together a plurality of partial images acquired by using a microscope while changing a viewing field with respect to a sample; an uncaptured-region-color setting step of setting pixel values of an uncaptured region on the basis of pixel values of rows of pixels at at least one side of the partial images that are positioned at edge portions of the captured-region image generated in the captured-region-image generating step; and an image combining step of generating a combined image by combining the captured-region image generated in the captured-region-image generating step and an uncaptured-region image that has the pixel values set in the uncaptured-region-color setting step.

In addition, another aspect of the present invention provides a microscope-image processing program that causes a computer to execute: a captured-region-image generating step of generating a captured-region image by pasting together a plurality of partial images acquired by using a microscope while changing a viewing field with respect to a sample; an uncaptured-region-color setting step of setting pixel values of an uncaptured region on the basis of pixel values of rows of pixels at at least one side of the partial images that are positioned at edge portions of the captured-region image generated in the captured-region-image generating step; and an image combining step of generating a combined image by combining the captured-region image generated in the captured-region-image generating step and an uncaptured-region image that has the pixel values set in the uncaptured-region-color setting step.

The present invention affords an advantage in that it is possible to make boundaries between a background color of acquired partial images and uncaptured regions inconspicuous even when white balance adjustment and shading are not appropriately performed.

REFERENCE SIGNS LIST 1 microscope-image processing apparatus
2 captured-region-image generating portion
3 uncaptured-region-image generating portion (uncaptured-region-color setting portion)
4 image combining portion
100 microscope
X sample
S1 captured-region-image generating step
S2 uncaptured-region-image generating step (uncaptured-region-color setting step)
S3 image combining step

The invention claimed is:

1. A microscope-image processing apparatus comprising:
   a processor comprising hardware, wherein the processor is configured to implement:
      generate a captured-region image by pasting together a plurality of partial images acquired by using a microscope while changing a viewing field with respect to a sample;
      to set pixel values of an uncaptured region based on pixel values of rows of pixels at at least one side of the partial images that are positioned at edge portions of the generated captured-region image; and
      generate a combined image by combining the generated captured-region image and an uncaptured-region image that has the set pixel values, wherein the uncaptured region is a region formed by excluding the captured-region image from a quadrangular region of the combined image.

2. A microscope-image processing apparatus according to claim 1, wherein the pixel values of the uncaptured region are set based on pixel values of the rows of pixels positioned at four sides of the combined image.

3. A microscope-image processing apparatus according to claim 1, wherein the pixel values of the uncaptured region are set based on pixel values of the rows of pixels positioned over the entire perimeter of the captured-region image.

4. A microscope-image processing apparatus according to claim 1, wherein the pixel values of the uncaptured region are set based on pixel values of the rows of pixels positioned at peripheral edges of the partial images positioned at four corners of the combined image.

5. A microscope-image processing apparatus according to claim 1, wherein the pixel values of the uncaptured region are set to an average or a mode of pixel values of the rows of pixels.

6. A microscope-image processing apparatus according to claim 1, wherein the pixel values of the uncaptured region are set to an average or a mode of pixel values of the row of pixels in which the difference between a minimum value and a maximum value of pixel values is the smallest among the rows of pixels positioned at the four sides of the combined image, the rows of pixels positioned over the entire perimeter of the captured-region image, or the rows of pixels positioned at the peripheral edges of the partial images positioned at the four corners of the combined image.

7. A microscope-image processing apparatus comprising:
a processor comprising hardware, the processor configured to:
generate a captured-region image by pasting together a plurality of partial images acquired by using a microscope while changing a viewing field with respect to a sample;
set pixel values of an uncaptured region based on pixel values of rows of pixels at at least one side of the partial images that are positioned at edge portions of the generated captured-region image; and
generate a combined image by combining the generated captured-region image and an uncaptured-region image that has the set pixel values, wherein the uncaptured region is a region formed by excluding the captured-region image from a quadrangular region of the combined image.

8. A microscope-image processing method comprising:
a captured-region-image generating step of generating a captured-region image by pasting together a plurality of partial images acquired by using a microscope while changing a viewing field with respect to a sample;
an uncaptured-region-color setting step of setting pixel values of an uncaptured region based on pixel values of rows of pixels at at least one side of the partial images that are positioned at edge portions of the captured-region image generated in the captured-region-image generating step; and
an image combining step of generating a combined image by combining the captured-region image generated in the captured-region-image generating step and an uncaptured-region image that has the pixel values set in the uncaptured-region-color setting step, wherein the uncaptured region is a region formed by excluding the captured-region image from a quadrangular region of the combined image.

9. A non-transitory computer readable medium configured to process microscope-images and configured to execute:
a captured-region-image generating step of generating a captured-region image by pasting together a plurality of partial images acquired by using a microscope while changing a viewing field with respect to a sample;
an uncaptured-region-color setting step of setting pixel values of an uncaptured region based on pixel values of rows of pixels at at least one side of the partial images that are positioned at edge portions of the captured-region image generated in the captured-region-image generating step; and
an image combining step of generating a combined image by combining the captured-region image generated in the captured-region-image generating step and an uncaptured-region image that has the pixel values set in the uncaptured-region-color setting step, wherein the uncaptured region is a region formed by excluding the captured-region image from a quadrangular region of the combined image.

* * * * *